United States Patent [19]

Kuroda et al.

[11] 3,958,226

[45] May 18, 1976

[54] DATA COMMUNICATION SYSTEM

[75] Inventors: Takeshi Kuroda, Nagaokakyo; Saburo Hirai, Kyoto; Yujiro Sazanami, Nagaokakyo; Hidekuni Nakao, Chofu, all of Japan

[73] Assignees: Omron Tateisi Electronics Co., Kyoto; Nippon Mining Co., Ltd., Tokyo, both of Japan

[22] Filed: Aug. 30, 1974

[21] Appl. No.: 501,873

[30] Foreign Application Priority Data
Sept. 8, 1973   Japan............... 48-101410

[52] U.S. Cl. .................. 340/172.5; 179/15 AL
[51] Int. Cl.² ................................. H04J 3/00
[58] Field of Search ............ 340/172.5; 179/15 AL

[56] References Cited
UNITED STATES PATENTS

| | | | |
|---|---|---|---|
| 3,242,467 | 3/1966 | Lamy | 340/172.5 |
| 3,445,822 | 5/1969 | Driscoll | 340/172.5 |
| 3,496,551 | 2/1970 | Driscoll et al. | 340/172.5 |
| 3,629,854 | 12/1971 | Hauck et al. | 340/172.5 |
| 3,639,904 | 2/1972 | Arulpragasam | 179/15 AL |
| 3,680,053 | 7/1972 | Cotton et al. | 179/15 AL |
| 3,699,529 | 10/1972 | Beyers et al. | 340/172.5 |
| 3,735,365 | 5/1973 | Nakamura et al. | 340/172.5 |
| 3,755,786 | 8/1973 | Dixon et al. | 179/15 AL |
| 3,755,789 | 8/1973 | Collins | 179/15 AL |
| 3,761,879 | 9/1973 | Brandsma et al. | 340/172.5 |

Primary Examiner—Malcolm A. Morrison
Assistant Examiner—Errol A. Krass
Attorney, Agent, or Firm—Wolfgang G. Fasse; Willard W. Roberts

[57] ABSTRACT

In a data communication system in which data communication is carried out between two or more data processing units and at least one device to be controlled thereby, each coupled via data station to a common data transmission path connected in a loop fashion, a conflict preventing circuit is provided between said device to be controlled and the associated data station, which conflict preventing circuit comprises a flip-flop to be set in response to its own device identifying data received from a particular communicating unit for keeping its own device enabled, an address register for storing a unit identifying data of said communicating unit, and an AND gate responsive to the device identifying data input and a busy signal from its own device for latching said flip-flop and said address register while the device is busy or communicating with said particular unit, thereby preventing said flip-flop and said address register from being affected from a data transmitted from a different unit while the device is communicating with said unit and thus avoiding a problem of conflict.

14 Claims, 5 Drawing Figures

DATA COMMUNICATION SYSTEM

BACKGROUND OF THE INVENTION

1. Field of the Invention

The present invention relates to a data communication system. More specifically, the present invention relates to such a system which comprises a plurality of controlling computers and devices being controlled which are connected to a common data bus by means of data stations, whereby backup between computers and transmission and reception of a process data between computers and devices are carried out at a high transmission rate.

2. Description of the Prior Art

Of late years electronic information processing systems have progressed toward an on-line and large scale type. A large scale implementation in this context implies not only employment of a larger sized computer but also installation of a number of remote terminals in a wider area. A typical data communication system comprises a plurality of controlling computers and devices being controlled installed in a wider area which are connected to a common data bus through the respective data stations, such that data communication is carried out between the computers or between the computers and devices. Such a system, often referred to as "a data highway system," has become the object of attention of those concerned in iron plants, petrochemical plants and the like, in view of remarkable reduction of a wiring cost in spite of a large size and more complicacy of the plants.

FIG. 1 illustrates a block diagram of a typical prior art data highway system in which the present invention may be advantageously adopted. The system shown comprises a plurality of data stations 101 to 107 interposed in a common loop connected data bus DB in a cascade fashion. Devices such as input devices, output devices, peripheral units and the like are connected to the data stations 103, 104, 105 and 107 and controlling computers 201, 202 and 206 are connected to the data stations 101, 102 and 106, respectively, such that the abovementioned devices are controlled by the abovementioned computers through exchange of information through the data stations and the data bus DB. The device being controlled may be one which is operable in response to a data given thereto from a certain computer through the abovementioned exchange of information, such as a typewriter 301, a cathode ray tube 303, a display 304, or the like, or may be one which serves to provide a data obtained thereat to a certain computer, such as a measuring device 302, a card reader 305 or the like.

Operation of the data highway system shown will be described briefly in the following. Now take an example in which a data is transmitted from the controlling computer 201 to the typewriter 301 or the measuring device 302. The controlling computer 201 serves to provide a data in a form of parallel bit signal. The data, as transmitted, comprises an address of its own data station 101 from which the said data is transmitted, an address of the data station 104 to which the said data is to be transmitted, an address of the device specifying which device should communicate the data (the typewriter 301 or the measuring device 302, for example), a series of character code signals in case where the typewriter 301 is specified, a point address for specifying a measuring point in case where the measuring device 302 is specifed, and other relevant data. The above-mentioned data, as transmitted from the controlling computer 201, is complied in a predetermined format of a series bit signal by the data station 101, and such a compiled or modulated signal is transmitted through the data bus DB, which is typically comprised of a single signal transmission path or two signal transmission paths.

When the above-mentioned modulated signal is transmitted along the data bus DB, all the other data stations 102 to 107 receive the modulated signal and demodulate it therein, whereby the address of the data station 104, as addressed, is compared with its own address stored therein. Only the data station 104 the address of which coincides with its own stored address at the above-mentioned comparison of the addresses is enabled to withdraw the transmitted data from the data bus DB.

The data station 104 serves to check the withdrawn data. If there is no error as a result of the above-mentioned check, the data as withdrawn in the form of a bit series signal is converted to a bit parallel signal and the character code signal or the point address is transmitted to the typewriter 301 or the measuring device 302, as specified by way of the device address, respectively, as the case may be. If any error is detected as a result of the above-mentioned error check, signal is transmitted back to the computer which requests that the data is again transmitted from the computer to the device. This request signal is received by the data station 101 to transmit the same data again to the device. If and when the typewriter 301 is specified by way of the device address, the typewriter 301 receives the transmitted data and typewrites the characters until the typewriting of all the data is completed. If and when the measuring device 302 is specified, the device 302 makes measurement of the measuring points as specified by way of a point address, the measured data of which is transmitted to the data station 104 in the form of bit parallel signal, whence a series bit signal is withdrawn to the data bus DB. More specifically, the data station 104 converts into a series bit signal a data comprising its own data station address, the address of the data station 101 to be addressed, the device address of the measuring device 302, the measured data and the other relevant data, and modulates the bit series signal and transmits the modulated data to the data bus DB. The data station 101 detects its own data station address in the transmitted data and withdraws the data therein. If there is no error as a result of error checking, the data is delivered to the controlling computer 201 after it is converted to a bit parallel signal.

As seen from the foregoing description it is understood that in such a data highway sytem any one of the controlling computers 201, 202 and 203 can control any devices connected to the data stations 103, 104, 105 and 107. Therefore, it can happen that a single particular device being controlled is shared by two or more controlling computers for communication of the data therebetween. Such a problem of "conflict" should be absolutely avoided. For example, assume an instance in which the typewriter 301 is simultaneously controlled by two controlling computers 202 and 206. If such a situation is permitted two sentences from both computers are mixed up, which makes it impossible to read the print out of the typewriter 301. In order to avoid such an inconvenience it is necessary to keep waiting one computer, say 202, until the other computer, say 206, completes transmission of a full data. For this purposes it is desired or rather necessary to provide a hardware for refraining from receiving any request from the other computers, say 206 and/or 201, while one computer 202 is controlling the typewriter 301.

SUMMARY OF THE INVENTION

According to one aspect of the present invention, in a data communication system in which data communication is carried out between two or more data processing units and at least one device to be controlled thereby, each coupled via a data station to a common data transmission path connected in a loop fashion, a conflict preventing circuit is provided between said device to be controlled and the associated data station, which conflict preventing circuit comprises (a) first store means for storing its own device identifying data received from a communicating unit through the associated data station for keeping its own device enabled, (b) second store means for storing a unit identifying data identifying said particular unit now in communication with its own device, and (c) latching means responsive to a busy signal representative of a busy state of its own device for latching said first and second store means while the device is busy, thereby preventing said first and second store means from restoring a device identifying data and a unit identifying data transmitted from a different data processing unit while said device is communicating with the said particular unit, and thus avoiding any conflict of data communication betwen two or more units and the device.

According to another aspect of the present invention, said conflict preventing circuit further comprises (d) third store means to be in an active state responsive to a start signal of the data and to be in an inactive state responsive to an end signal of the data, which third store means is latched by said latching means, (e) coincidence means coupled to the input and output of said second store means for detecting coincidence of the input unit identifying data of the different unit and the output unit identifying data of the communicating unit, and (f) means responsive to a non-coincidence output from said coincidence means and said active state output from said third store means for providing a status signal representing whether said device is communicating with the said particular unit, whereby it is known that the device is communicating with said particular unit.

Therefore, a primary object of the present invention is to provide a rather simple hardware for avoiding any problem of conflict in data communication between two or more data processing units and a device being controlled by these units, each coupled via a data station interposed along a common loop connected data transmission path.

This object and other objects, features and advantages of the present invention will become more apparent when taken in conjunction with the following detailed description made with reference to the accompanying drawings.

DESCRIPTION OF THE PREFERRED EMBODIMENTS

Figure 1:
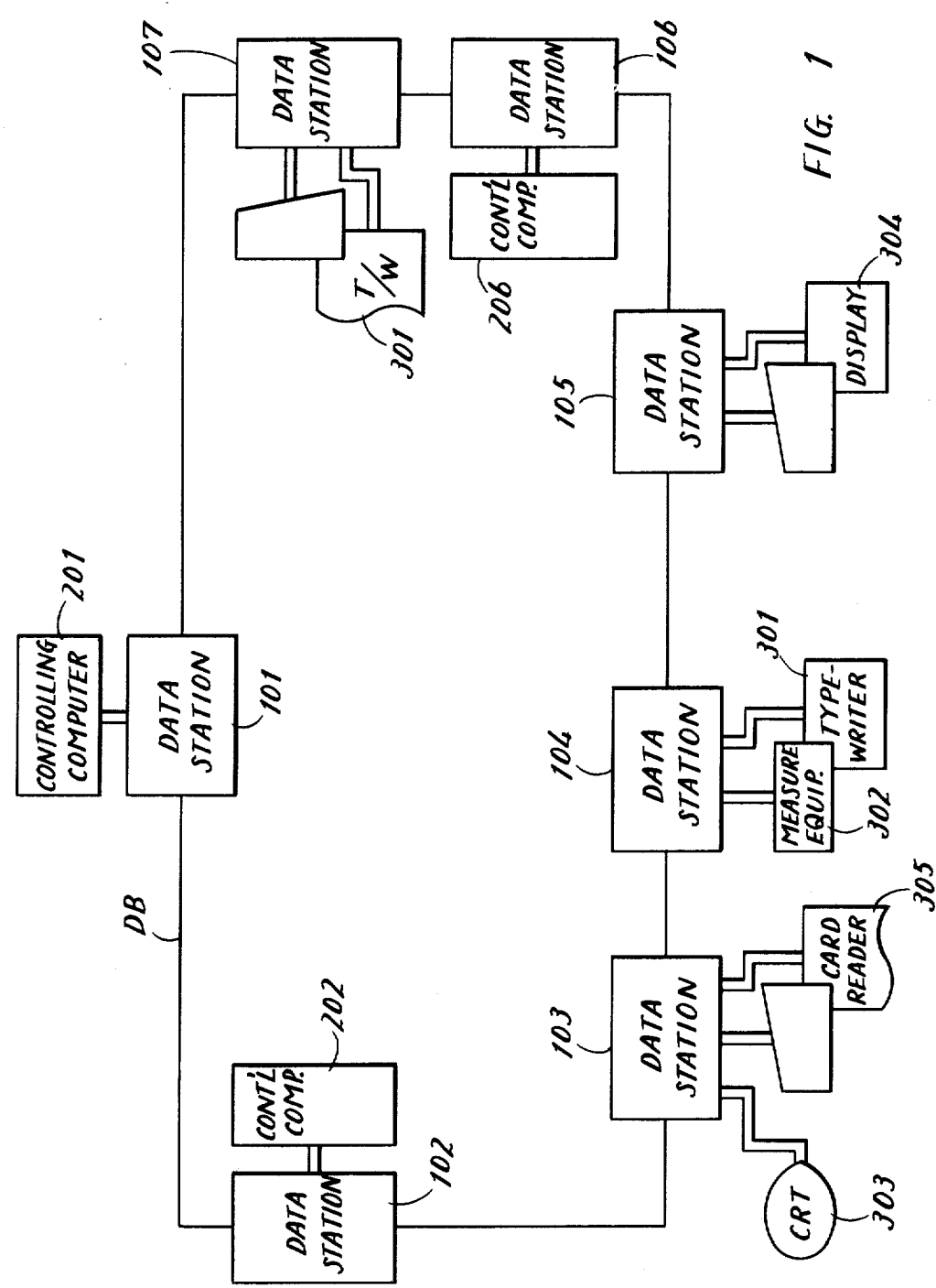
FIG. 1 illustrates a block diagram of a typical prior art data highway system in which the present invention may be advantageously adopted.
Figure 2:
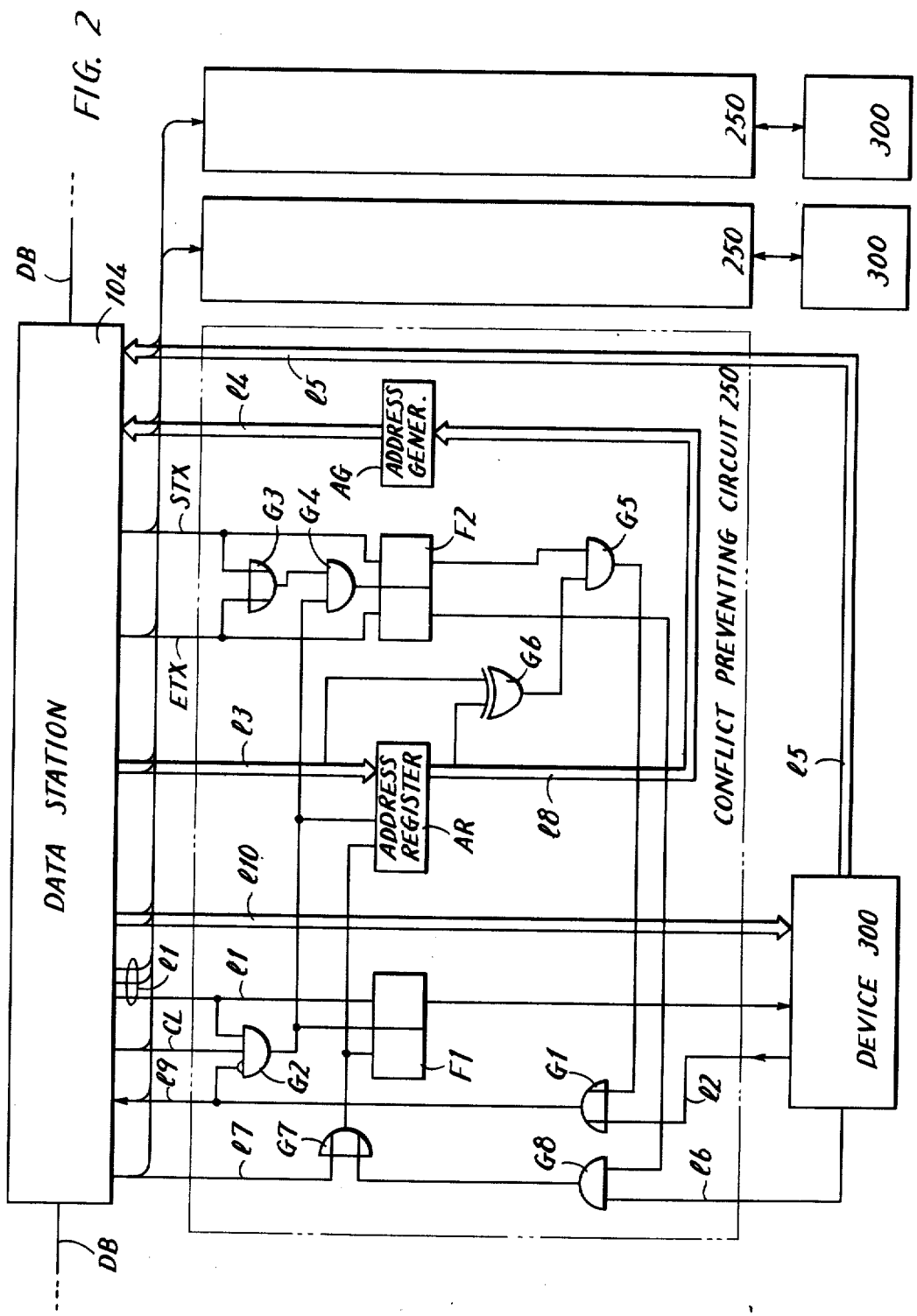
FIG. 2 illustrates a schematic diagram of an embodiment of the present invention.

Referring to FIG. 2, a schematic diagram of an embodiment of the present invention is shown. The embodiment is shown comprising three conflict preventing circuits 250 of the present invention connected between the data station 104 shown in FIG. 1 and three peripheral devices 300. It is pointed out that one of the peripheral devices is illustrated in a rather detailed schematic form while the remaining two peripheral devices are shown in a block form for simplicity of illustration.

Figure 3:
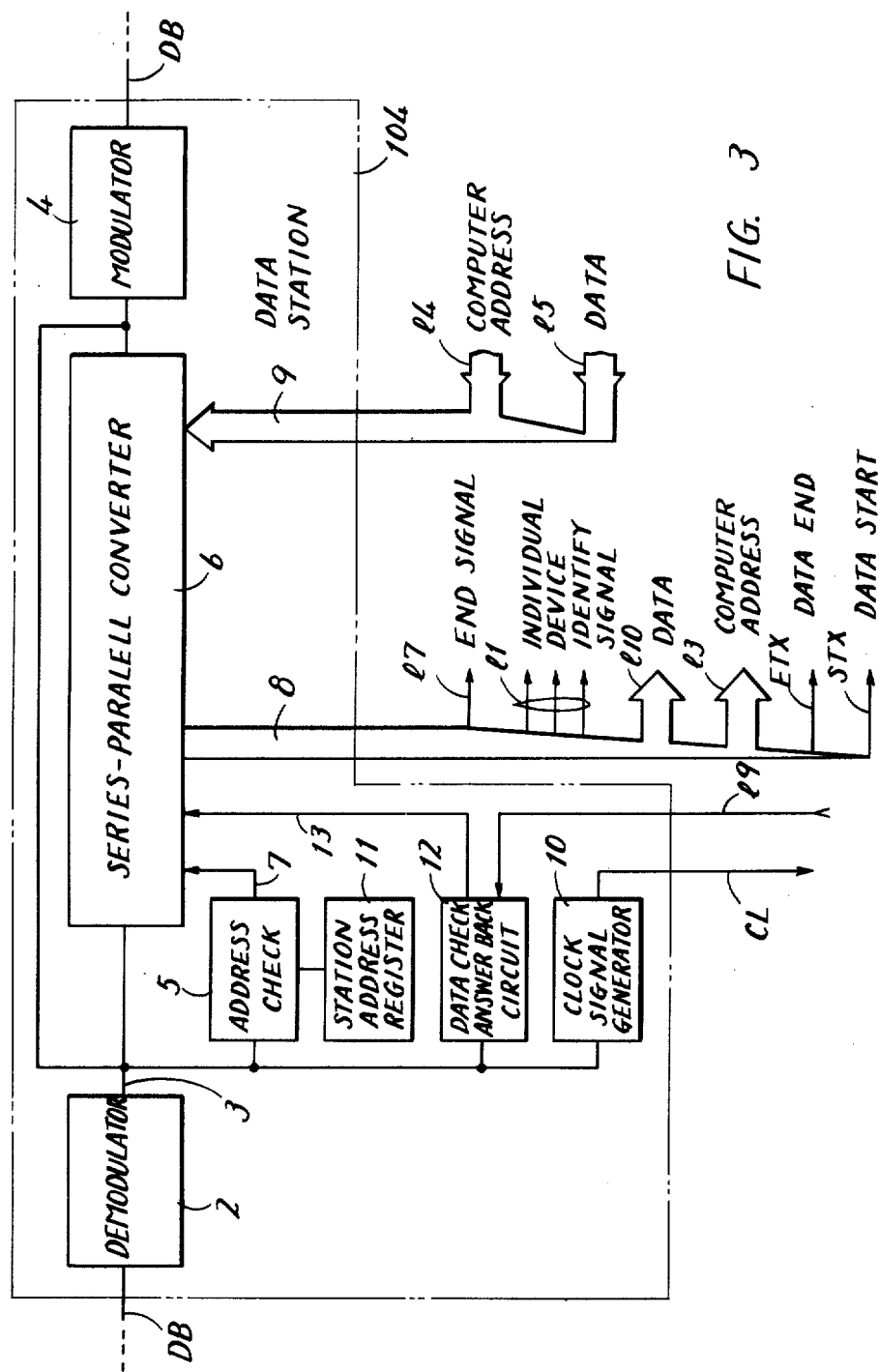
FIG. 3 illustrates a more detailed block diagram of the data station 104 shown in FIG. 2.

Before entering into detailed description of the conflict preventing circuits 250, it is believed appropriate to explain the data station 104 in some detail for facility of understanding of the subsequent description as to the circuits 250. A more detailed block diagram of the data station 104 is shown in FIG. 3. The data in a form of a bit series signal entering into the data station 104 is demodulated by a demodulator 2 and is fed through a line 3 to a modulator 4, which again modulates the received data to transmit it to the data bus DB. In this manner the data transmitted from the data station 101 is circulating in turn through a series of cascade connected data stations 102 to 107. A portion of the output from the demodulator 2 is applied to an address check circuit 5, which detects a data station address to be addressed included in particular bit positions in the series bit signal and compares the detected data station address with data station address of its own data station 104 stored in a station address register 11. If the former coincides with the latter a coincide output is obtained at a line 7 so that a series-parallel converter 6 is enabled. The coverter 6 stores the data as inputted from the line 3 and, when the coincidence output from the address check circuit 5 is provided, is enabled to provide an output at a line 8, which output has been converted from the series bit signal at the line 3 to a bit parallel signal. The converter 6 also serves to convert a parallel bit signal received at a line 9 into a bit series signal to provide it to the modulator 4, which modulates the series bit signal from the converter 6 and transmits it to the data bus DB.

A clock signal generator 10 generates clock signals in response to the demodulated output of the data from the demodulator 2, which clock signals are provided to the device 300 through a line CL. A data check answer back circuit 12 receives the data from the demodulator 2 through the line 3 to check the data and provides a resultant output at a line 13, thereby enabling the converter 6 to rearrange the data stored in the converter 6 such that the address of the receiving station 101, the address of the transmitting station 104 and the resultant output of the data check may be modulated by the modulator 4 and transmitted to the data bus DB. If and when the data has not been properly received, the converter 6 is controlled not to provide the data at the line 8, thereby to ensure that the device 300 is enabled only if and when the data has been received properly.

As described in the section of Description of the Prior Art, the device 300 being controlled either may be one which is operable in response to the data given thereto from a certain computer through exchange of the data, such as a typewriter 301, a cathode ray tube 303, a display 304 or the like, or may be one which serves to provide the data obtained thereat back to a certain computer, such as a measuring device 302, a card reader or the like.

Figure 4:
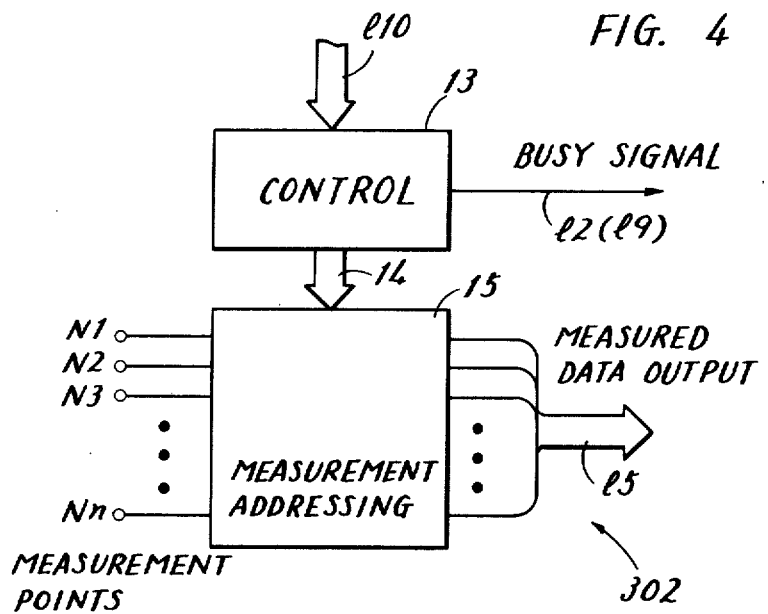
FIG. 4 illustrates a more detailed block diagram of the measuring device 302.

For the purpose of further description of the implementation of the present invention, let it be assumed that any one of the computers, say the computer 202, delivers a data which specifies a particular device 300, as shown in some detail in FIG. 4, connected to a particular data station 104, as shown in some detail in FIG. 3. The data received at the data station 104 is stored in the converter 6 after it is converted into a bit series signal, and is withdrawn through the line 8. Of the data thus stored, only a portion representative of the address of the transmitting data station is withdrawn through the line 3 in a form of parallel bit signal. A plurality of individual device identify signals, each individually representative of the respective device address for specifying a device being controlled, are obtained at lines, generally denoted as $l1$. Referring to FIG. 2, it is seen that three individual device identify signals are withdrawn as $l1$ for individually specfying three devices 300. The converter 6 also provides signals STX and ETX, which will be discussed in more detail subsequently. Another portion of the data output from the converter 6, withdrawn from the line 10, is either a character data to be typewritten by a typewriter, in case where the device is a typewriter, or a point address for specifying a point or points where measurement is to be made by a measuring device, in case where the device is a measuring device. A further output from the converter 6 is an end signal obtained at the line $l7$, which is representative of completion of transmitting the data. A data input to the converter 6 through lines $l4$ and $l5$ and further through a line 9 will be discussed subsequently. An individual device identify signal $l1$ is fed to a set input of a delay flip-flop F1, a set output of which is further fed to the device 300 as an enabling signal. The device 300 is so adapted to generate a busy signal at the line $l2$ which is representative of a busy or operating state of the device 300, as to be more fully described hereinafter. The busy signal at the line $l2$ is supplied through an OR gate G1 and further through the line $l9$ to the data station 104, while it is fed to an AND gate G2 as an inhibiting input. Referring again to FIG. 3, the busy signal at the line $l9$ is applied to the data check answer back circuit 12 to enable the circuit 12 to inform the converter 6 of the busy state of the device 300, so that a new data may not be received at the converter 6.

As described in the foregoing the flip-flop F1 is of a delay type. A delay input to the flip-flop F1 is supplied from the AND gate G2, inputs of which are conditioned by an inversion of a busy signal at the line $l9$, an individual device identify signal at the line $l1$ and a clock pulse obtained through the line CL from a clock signal generator 10 (see FIG. 3). Thus it is understood that when an individual device identify signal $l1$ is obtained while the device 300 is not busy and thus no busy signal is obtained at the line $l9$, an ANDed output is obtained from the AND gate G2 in synchronism with the clock pulse. The output from the AND gate G2 enables the flip-flop F1 to be set in response to the individual device identify signal $l1$, as described previously. The output from the AND gate G2 is also applied to an address register AR to enable it.

Concurrently with the individual device identify signal $l1$, a computer address signal is obtained at the line $l3$ which is representative of which computer, (say the computer 202) transmitted the data including the abovementioned individual device identify signal $l1$ and is loaded as a function of the ouput from the AND gate G2. An output from the address register AR is applied to an address generator AG to generate an address signal identifying which computer (say the computer 202) should be communicated with. The output address signal from the address generator AG is applied through the line $l4$ and further through the line 9 to the converter 6 (see FIG. 3) and will be stored in a register in the data station 102 to be addressed As already described, the device may be classified as of two types from the view point of the function thereof. One is such a device as a measuring device 302 which provides some output such as a measured data obtained in response to the instructions from the computer. The other is such a device as a typewriter 301, a cathode ray tube or the like which is operable in response to the instructions from the computer but provides no output therefrom.

Assuming that the device 300 is a measuring device 302, a point address is obtained at the line $l10$ from the data station 104 and is applied to the device 300. A more detailed block diagram of the measuring device 302 is illustrated in FIG. 4. The point address, as obtained at the line $l10$, is fed to a control 13 of the device 302, which in response thereto generates a busy signal at the line $l2$, and further through a line 14 instructs a measurement addressing unit 15 to make specified measurement of the point address as addressed out of the measuring points Nl to Nn. The resultant measured data is taken out through the line $l5$ and further through the line 9 back to the converter 6. The measured data is, after it is converted in a bit series signal and modulated as described previously, returned to the computer 202, which is identified by the computer address signal at the line $l4$. More specifically, the measured date obtained at the line $l5$ is loaded in the converter 6 through the line 9 (see FIG. 3) and, together with other data loaded therein such as a station address of the transmitting station (say the station 102) a station address of the receiving station (say the station 104), a device address, and a point address, is modulated by the modulator 4 and transmitted again on the data bus DB. When all the measured data at the line $l5$ is transmitted from the data station 104, a measurement end signal is generated at the line $l7$. More specifically, when all the measured data is supplied to the converter 6 through the line 9 (see FIG. 3), the data is transmitted therefrom on the data bus DB and in response thereto the measurement end signal is obtained from the converter 6 through the line 8 and further through the line $l7$. Referring to FIG. 2, the measurement end signal is fed through the line $l7$ and an OR gate G7 to a rest input of the flip-flop F1 to reset it and further to the address register AR to clear it.

Figure 5:
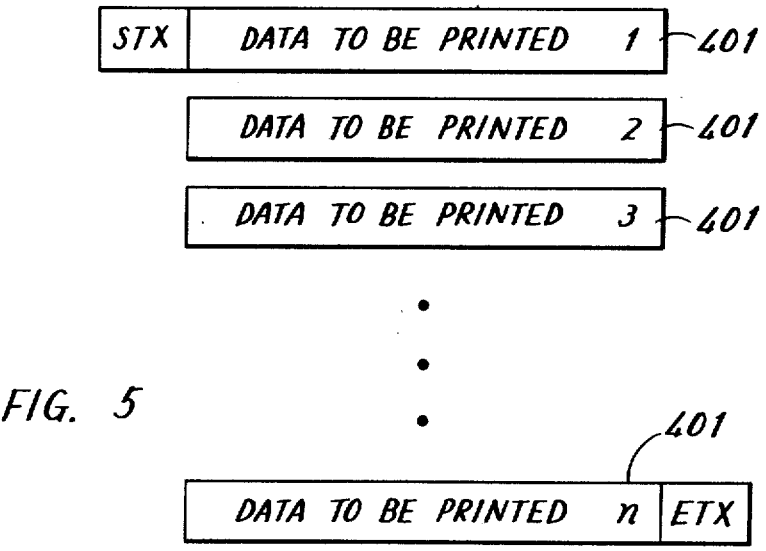
FIG. 5 illustrates a format of the data to be printed.

Now let it be assumed that the device 300 is a typewriter 301. Then a data to be printed or typed is supplied through the line $l10$ to the device 300. A typical format of such a data is shown in FIG. 5, which comprises a start signal STX at the beginning and an end signal ETX at the end and a series of data to be printed 401 therebetween, transmitted simultaneously with the device identify signal and other address signals. The start signal is a coded signal which indicates the start of the character data 401 and the end signal is a coded signal which indicates the end of the character data 401, which signals are usually added to the data signal, if and when the data is a character data to be printed or typed by a printer or typewriter. Referring again to FIG. 2, the start signal STX and the end signal ETX are fed to a set input and a rest input, respectively, of a delay flip-flop F2, while a delay input is applied from an output of an AND gate G4. One input of the gate G4 is an ORed output from an OR gate receiving the said start and end signals STX and ETX as inputs thereto, while the other input is an ANDed output from the gate G2. Thus it is understood that the flip-flop F2 is set in synchronism with the clock CL only when an individual device identify signal l1 and a start signal are provided while the device is not busy and thus no busy signal is obtained at the line l9.

An input to the address register AR and an output from the address register AR are fed to an EXCLUSIVE OR gate G6 as inputs thereto and an output therefrom is fed to an AND gate G5 as one input thereto, another input of which is supplied from a set output of the flip-flop F2. An output from the AND gate G5 is applied to the OR gate G1 as a busy signal which is representative of a busy state in which the character data to be printed is being received by the device 300.

The end signal ETX resets the flip-flop F2 and a reset output therefrom is applied to an EXCLUSIVE OR gate G6 to enable it. A typewriter 302 by way of the device 300 is so adapted to provide an end signal at the line l6 when a typewriting operation is completed, which end signal is applied to the EXCLUSIVE OR gate G6 as one input thereto. Therefore, an ANDed output is obtained from the AND gate G8 if and when the character data is ended and the typewriting operation therefor is over. The output from the gate G8 is applied to the flip-flop F1 to reset it and is applied to the address register AR to clear it. A further means is provided for transmitting a busy signal obtained at the line l9 to another computer corresponding to the address signal therefor, when the device 300 is specified by said another computer while the device 300 is operating under the control of one computer. More specifically stated referring again to FIG. 3, assuming that the data is transmitted from the data station 101 to the device 300 coupled to the station 104 while the said device 300 is operating under the control of the computer 202 through the data station 102, the new data will be stored in the converter 6. However, a busy signal l9 has been obtained at the line l9 and applied to the data check answer back circuit 12, so that the converter 6 transmits through the modulator 4 the data comprising an address of the receiving station 101, an address of the transmitting station 104 and information to the effect that the device 300 coupled to the station 104 is busy.

Now operation of the present invention will be described in the following. For this purpose first let it be assumed that the device 300 coupled to the station 104 is a measuring device 302 and the device 302 is specified by the computer 202. The individual device identify signal is obtained individually only at the corresponding individual line l1 so as to specify the device 302 connected to the station 104 and an address signal identifying the computer 202 is obtained at the line l3. The individual device identify signal sets the flip-flop F1 as a function of the clock CL to store a state in which the device 302 is specified. Similarly the computer address signal is loaded in the address register AR as a function of the clock CL to store the state in which the computer 202 is communicating with the device 302. A set output from the flip-flop F1 is fed to the device 302 (the device 300 in FIG. 2) to enable it to make measurement of measurement points Nl to Nn as addressed by the data obtained at the line l10 from the converter 6 and a measured data is withdrawn through the line l5 and further through the line 9 to the converter 6. While the device 302 is in operation, the busy signal 12 serves to disable the AND gate G2. Therefore, the clock signal CL is not supplied to the flip-flop F1 as a delay input any more and thus the flip-flop F1 is latched or kept storing the individual device identify signal l1 individually and uniquely identifying the device 302 until it is reset. Similarly, the address register AR is latched or kept storing and thus providing an address signal l8 uniquely identifying the computer 202. The busy signal l2 is also fed to the computer 202 through the data station 104, as described previously, so that it is detected thereby that the measuring device 302 is in operation.

It is to be pointed out that when the measuring device 300 or 302 is specified no start and end signals STX and ETX are generated. Therefore the AND gate G4 is kept disabled and the flip-flop F2 is kept reset and thus the AND gate G5 is kept disabled. Accordingly an output from the EXCLUSIVE OR gate G6 is prevented from affecting to the operation of the other circuit components.

Further let it be assumed that another computer 206 transmits a data to control the same measuring device 302 to make measurement under the instructions therefrom. An individual device identify signal l1 obtained from the data sent from the computer 206 is also ready to be loaded in the flip-flop F1. However, since the AND gate G2 has been disabled as a function of the busy signal l9, no clock pulse is fed to the delay input of the flip-flop F1 and thus no device identify signal is loaded in the flip-flop F1 any more. As a result, the measuring device 302 (the device 300 in FIG. 2) is not disturbed from a proper operation by another computer 206, while it is in operation under the control of the computer 202 and thus any problem of conflict between two or more computers may be avoided. The busy signal l9 representative of the busy state of the device 302 is transmitted to the computer 206 through the station 104, as described previously, so that the operating state of the device 302 may be detected by the computer 206.

The measured output obtained at the line l5 from the measuring device 302, as specified by the computer 202, is transmitted through the data station 104 to the computer 202 as a function of the address generated by the address generator AG. When all the measured output 15 has been transmitted through the data station 104, an end signal l7 is obtained to rest the flip-flop F1 and to clear the address register AR.

Let it be assumed that the device 300 coupled to the station 104 is a typewriter 301 and the device 301 is specified by the computer 202. The individual device identify signal is obtained individually only at the corresponding individual line l1 based upon the data from the computer 202 so as to specify and enable the device 301 such as a typewriter connected to the station 104. At the same time an address signal identifying the computer 202 to be addressed for a return data, if any, is obtained at the line l3. However, the typewriter 301 does not generate any measured data such as obtained in the measuring device 302 and therefore the address generator AG may be dropped from further consideration of operation of the typewriter 301 in conjunction with the present invention. The character data to be printed which is in the format as shown in FIG. 5 is also obtained at the line l10 from the computer 202 through the data station 104. The start signal STX thereof sets the flip-flop F1 as a function of the clock signal CL and a set output thereafter from enables the AND gate G5. Thereafter a series of the datas to be printed 401 is supplied from the converter 6 of the data station 104 through the line l10 to the typewriter 301.

Only if and when the computer 202 specifies the typewriter 301, the address signal at the input line l3 to the address register AR is the same as the address signal at the output line l8 from the address register AR. Therefore, no output is obtained from the EXCLUSIVE OR gate G6 and thus no output is obtained from the AND gate G5. Now assume that another computer 206 also specifies the typewriter 301. Then it is clear that the address signal at the line l3 identifies the computer 206, whereas the address signal at the line 18 remains the same as before. Therefore, an output is obtained from the gate G6 to enable the gate G5, so that the busy signal indicating that the typewriter 301 is receiving the character data is obtained through the gate G1 and through the line l9, which busy signal disables the gate G2, thereby latching the flip-flop F1, the address register AR and the flip-flop F2. The busy signal at the line l9 is transmitted through the data station 104 to the computer 206, whereby upon receipt of the said busy signal the computer 206 detects the typewriter 301 being in operation. If the typewriter 301 is of such a type as intermittently operable per each character printing, the busy signal obtainable at the line l2 from the typewriter 301 may be accordingly intermittent. The reason is that the busy signal obtainable from the gate G5 is of continuity and of a constant level, which ensures the receipt of the data only from the computer 202. As a result a problem of conflict between the computers can be avoided even in case where the typewriter 301 is controlled by any one of the computers. In case where another computer 206 specifies the same typewriter 301 while the typewriter 301 is in operation already under the control of the computer 202, the flip-flop F1 operates in substantially the same manner as described in conjunction with the measuring device 302.

When transmission of a series of the character data 401 is over, a print end signal is obtained at the line l6 to enable the AND gate G8. At the same time the end signal ETX is obtained to reset the flip-flop F2 and a reset output is applied to the gate G8. Therefore, and ANDed output is obtained therefrom to reset the flip-flop F1 and to clear the address register AR.

As described in the foregoing, according to the present invention, any conflict in connection with data communication can be avoided in a so-called data highway system, which conflict is likely to occur when two or more computers connected to a common data bus will be communicating with the same device at a time, since when one computer once starts to communicate with a certain device being controlled any other computer is prevented, by the use of a rather simplified hardware, from communicating with the same device thereafter until the data communication between the communicating computer and the device is over.

While specific preferred embodiments of the present invention have been described, it will be apparent that obvious variations and modifications of the invention will occur to those of ordinary skill in the art from a consideration of the foregoing description. It is, therefore, desired that the present invention be limited only by the appended claims.

What is claimed is:
1. A data communication system comprising:
a common data transmission path connected in a loop fashion;
a plurality of data stations provided along said data transmission path in a cascade fashion;
at least two data processing units, coupled to a separate said data station and for transmitting data through the data station associated therewith along said data transmission path,
at least one controllable device coupled to one of said data stations controllable in response to said data received from the data station associated therewith,
said data transmitted from each of said data processing units comprising a device identifying data for identifying one of said controllable devices to be selectively controlled, a controlling data for determining a manner of control of said controllable device to be selectively controlled, and a unit identifying data for identifying the respective data processing unit,
said controllable device being adapted to be controllable in response to said controlling data received from the data station associated therewith and to generate a status signal representing whether or not said device is in operation under said controlling data,
first store means interposed between said controllable device and the data station associated therewith for storing its own device identifying data received from said associated data station for keeping its own controllable device enabled,
second store means interposed between said controllable device and said data station associated therewith for storing said unit identifying data of one of said data processing units communicating at a given time with said controllable device being controlled at said given time by said controlling data transmitted from said one data processing unit,
latching means responsive to said status signal from said controllable device for latching said first and second store means while said controllable device is in operation by said controlling data, thereby preventing said first and second store means from restoring a device identifying data and a unit identifying data transmitted from a different data processing unit while said controllable device is in operation by said controlling data of said one data processing unit, and
means responsive to said unit identifying data from said different data processing unit for transmitting said status signal back to said different data processing unit.

2. A data communication system in accordance with claim 1, which further comprises means responsive to an end of data communication between said one data processing unit and said controllable device for resetting said first and second store means.

3. A data communication system in accordance with claim 2, in which said controllable device is adapted to generate an operation end signal when said controllable device has completed an operation directed by said controlling data, and said resetting means is responsive to said operation end signal.

4. A data communication system in accordance with claim 2, in which said data station is adapted to generate a transmission end signal upon termination of transmission of said data from said one data processing unit to said controllable device, and said resetting means is responsive to said transmission end signal.

5. A data communication system in accordance with claim 1, in which said associated data station comprises means for generating clock signals, and said latching means is operable in synchronism with said clock pulses.

6. A data communication system in accordance with claim 1, in which
- said controlling data comprises a start signal representative of the start of said controlling data and an end signal representative of the end of said controlling data, and which further comprises
- third store means to be in an active state responsive to said start signal and to be in an inactive state responsive to said end signal, said third store means being latched by said latching means,
- coincidence means coupled to the input and output of said second store means for detecting coincidence of the input unit identifying data and the output unit identifying data of said second store means,
- means responsive to a non-coincidence output from said coincidence means and said active state output from said third store means for providing a status signal representing whether or not said controllable device is receiving said controlling data, and
- means responsive to said unit identifying data from said different data processing unit for transmitting said status signal back to said different data processing unit.

7. A data communication system in accordance with claim 1, in which said controllable device is of a type which is responsive to said controlling data for providing a new data obtained at said controllable device.

8. A data communication system in accordance with claim 7, in which said controllable device is a measuring device the measurements of which are specified in accordance with said controlling data.

9. A data communication system in accordance with claim 1, in which said controllable device is of a type which is operable in accordance with said controlling data.

10. A data communication system in accordance with claim 9, in which said controllable device is a typewriter.

11. A data communication system in accordance with claim 9, in which said controllable device is a cathode ray tube.

12. A data communication system in accordance with claim 9, in which said controllable device is a display.

13. A data communication system comprising:
- a common data transmission path connected in a loop fashion;
- a plurality of data stations provided along said data transmission path in a cascade fashion;
- at least two data processing units, each coupled to one of said data stations for transmitting data through the data station associated therewith along said data transmission path,
- at least one controllable device coupled to one of said data stations controllable in response to said data received from the data station associated therewith,
- said data transmitted from each of said data processing units comprising a device identifying data for identifying one of said controllable devices to be selectively controlled, a controlling data for determining a manner of control of said controllable device to be selectively controlled, and a unit identifying data for identifying the respective data processing unit,
- said controllable device being adapted to be controllable in response to controlling data received from its associated data station to provide a new data and to generate a status signal representing whether or not said device is in operation under said last mentioned controlling data,
- first store means interposed between said controllable device and its associated data station for storing its own device identifying data received from said associated data station for keeping its own controllable device enabled,
- second store means interposed between said controllable device and its associated data station for storing said unit identifying data of one of said data processing units communicating at a given time with said controllable device controlled at said given time under said controlling data transmitted from said one data processing unit,
- latching means responsive to said status signal from said controllable device for latching said first and second store means while said controllable device is in operation under controlling data, thereby preventing said first and second store means from restoring device identifying data and unit identifying data transmitted from a different data processing unit while said controllable device is in operation under said controlling data of said one data processing unit;
- means coupled to said second store means and said controllable device for transmitting said unit identifying data stored in said second store means and said new data provided by said controllable device to said common data transmission path, and
- means responsive to said unit identifying data from said different data processing unit for transmitting said status signal back to said different data processing unit.

14. A data communication system comprising:
- a common data transmission path connected in a loop fashion;
- a plurality of data stations provided along said data transmission path in a cascade fashion,
- at least two data processing units, each coupled to one of said data stations for transmitting data through the data station associated therewith along said data transmission path,
- at least one controllable device coupled to one of said data stations controllable in response to said data received from its associated data station,
- said data transmitted from each of said data processing units comprising a device identifying data for indentifying one of said controllable devices to be selectively controlled, a controlling data for determining a manner of control of said controllable device to be selectively controlled, and a unit identifying data for identifying the respective data processing unit, said controlling data comprising a start signal representative of the start of said controlling data and an end signal representative of the end of said controlling data, said controllable device being adapted to be controllable in response to controlling data received from its associated data station and to generate a first status signal representing wherether or not said device is in operation under said last mentioned controlling data, first store means interposed between said controllable device and its associated data station for storing its own device identifying data received from its associated data station for keeping its own controllable device enabled.

second store means interposed between said controllable device and its associated data station for storing said unit identifying data of one of said data processing units communicating at a given time with said controllable device controlled at said time under said controlling data transmitted from said one data processing unit, third store means connected to be in an active state responsive to said start signal and to be in an inactive state responsive to said end signal, latching means responsive to said status signal from said controllable device for latching said first and second store means while said controllable device is in operation under said controlling data, thereby preventing said first and second store means from restoring device identifying data and unit identifying data transmitted from a different data processing unit while said controllable device is in operation under said controlling data of said one data processing unit, means responsive to said status signal obtainable from said controllable device and said inactive state output from said third store means for resetting said first and second store means, coincidence means coupled to the input and output of said second store means for detecting coincidence of the input unit identifying data and the output unit identifying data of said second store means, means responsive to a non-coincidence output from said coincidence means and said active state output from said third store means for providing a second status signal representing whether or not said controllable device is mating with said data processing unit, and means responsive to said unit identifying data from said different data processing unit for transmitting said status signal back to said different data processing unit.

* * * * *